May 30, 1933.   O. A. GRANOWSKI   1,911,313
APPARATUS FOR THE AUTOMATIC PRODUCTION OF
CONTAINERS FROM PAPER AND LIKE MATERIAL
Filed March 10, 1931    10 Sheets-Sheet 1
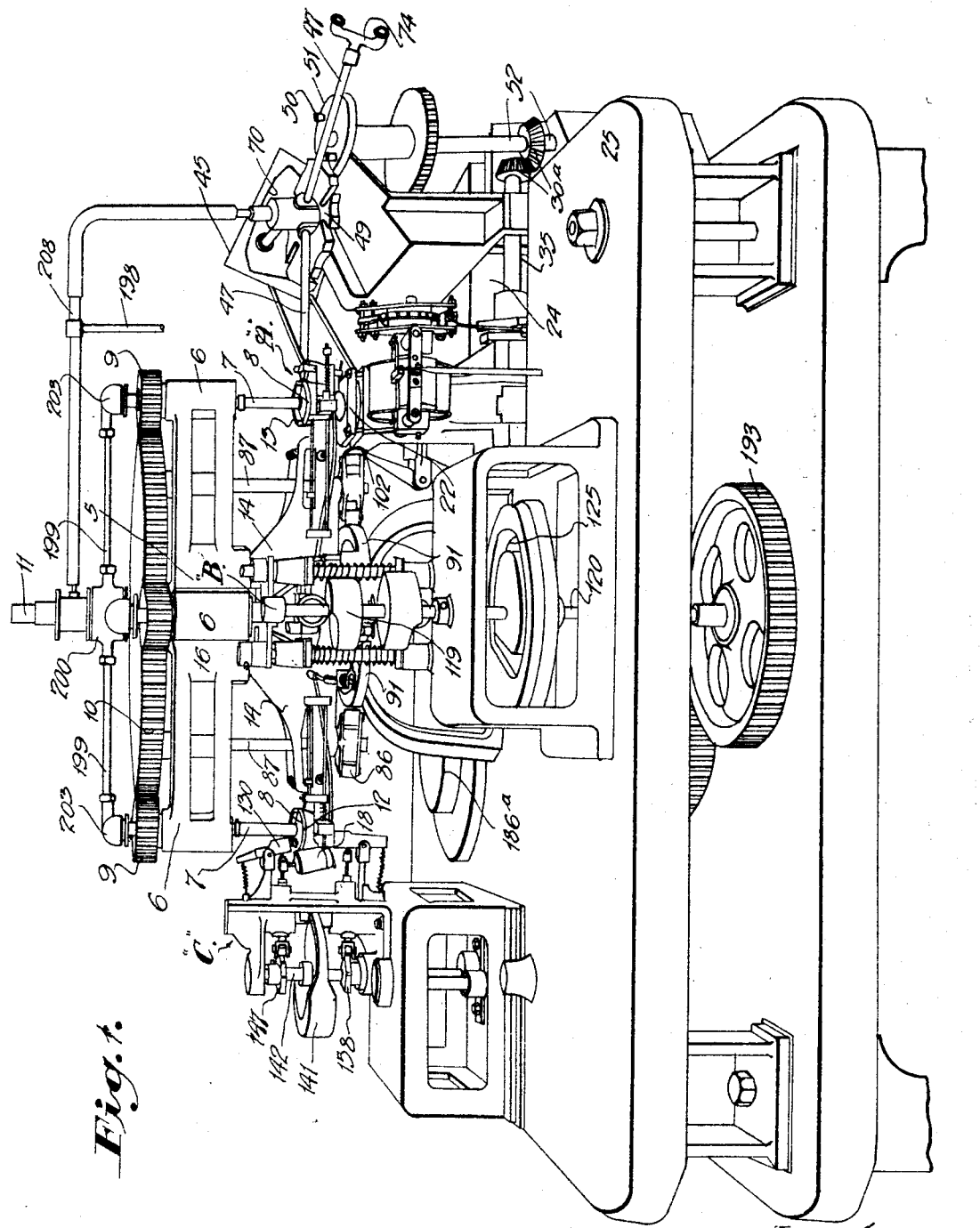
Inventor:
O. A. Granowski,
by C. F. Wenderoth
Att'y.

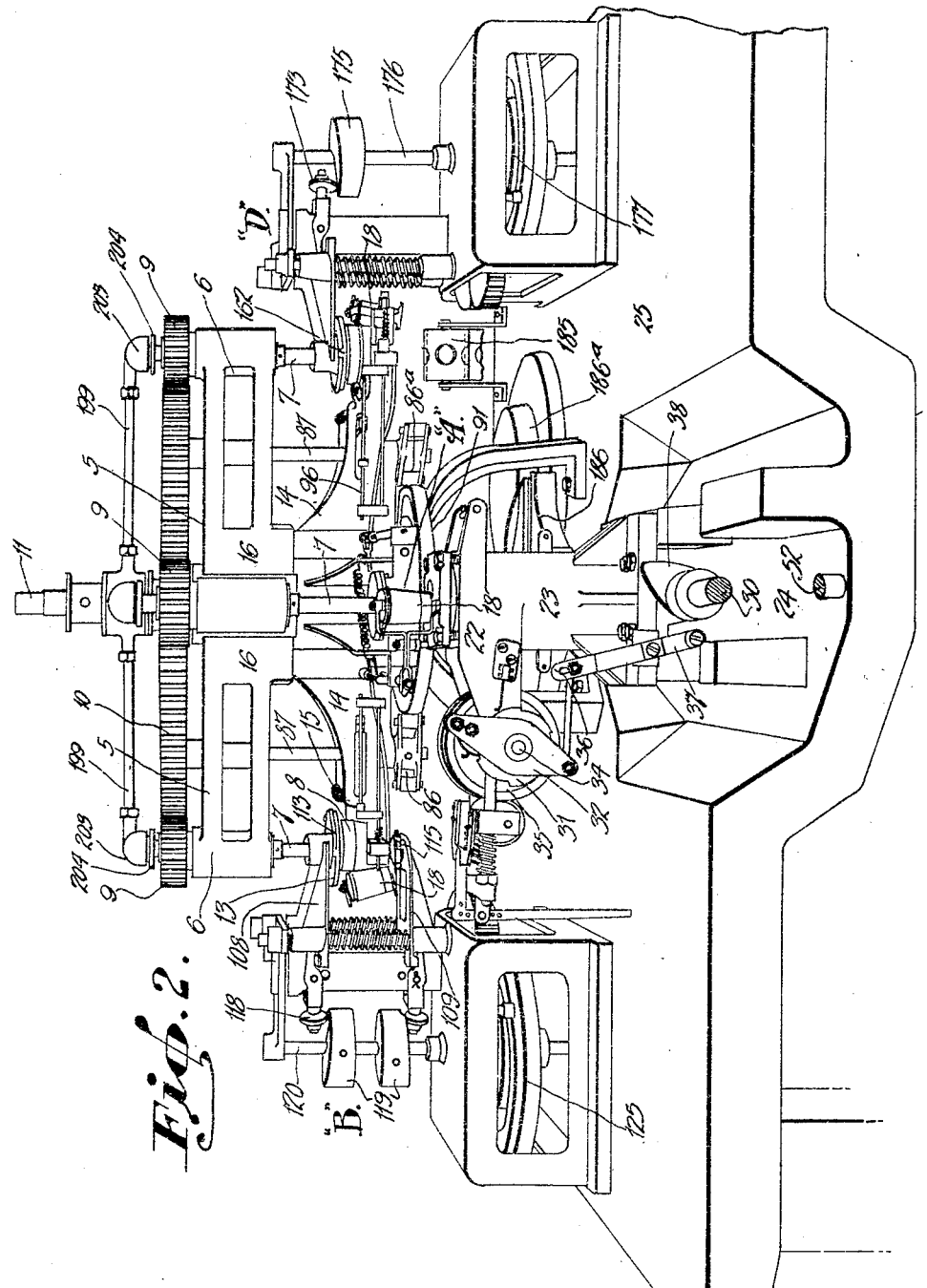

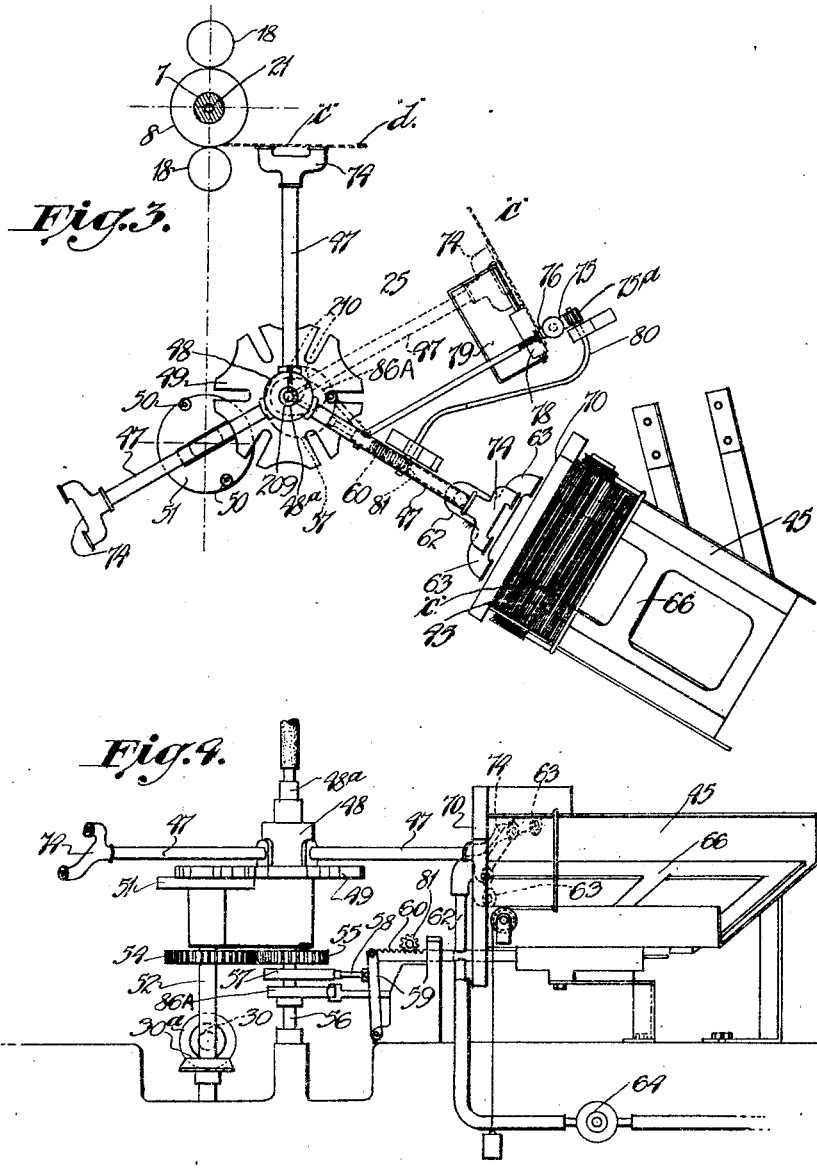

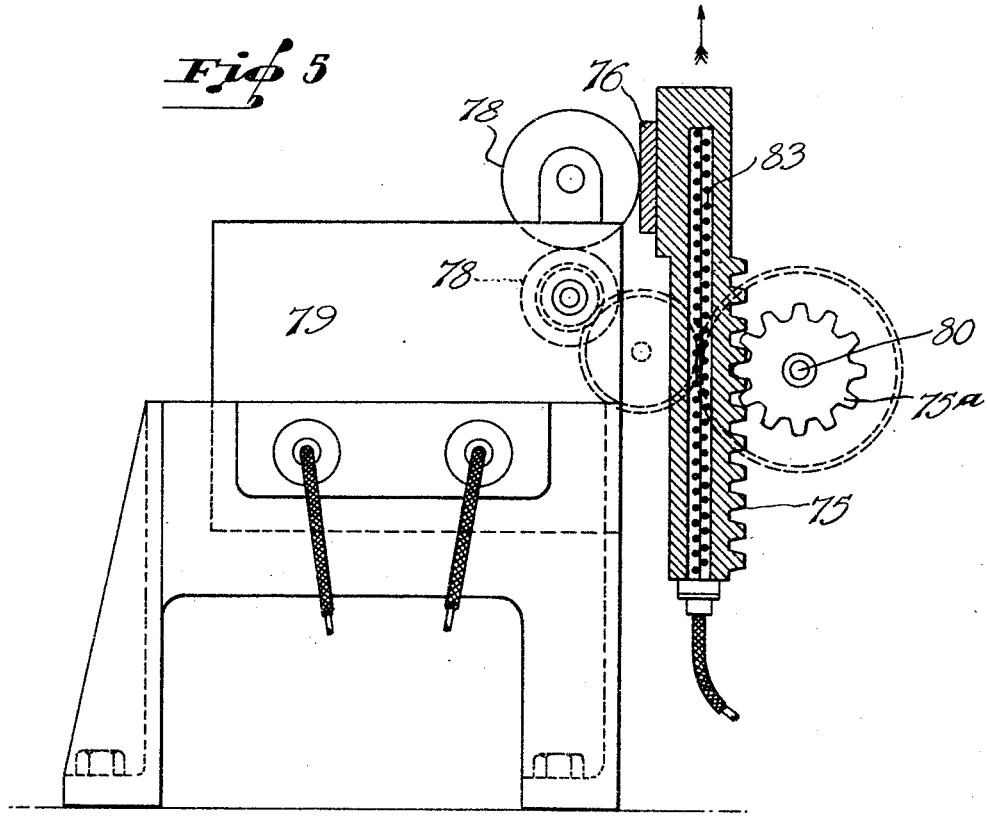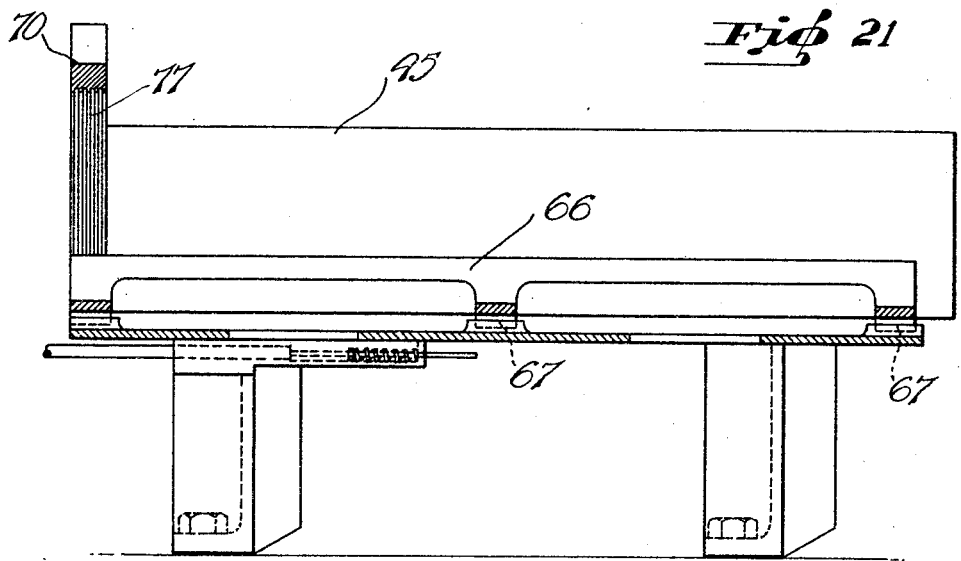

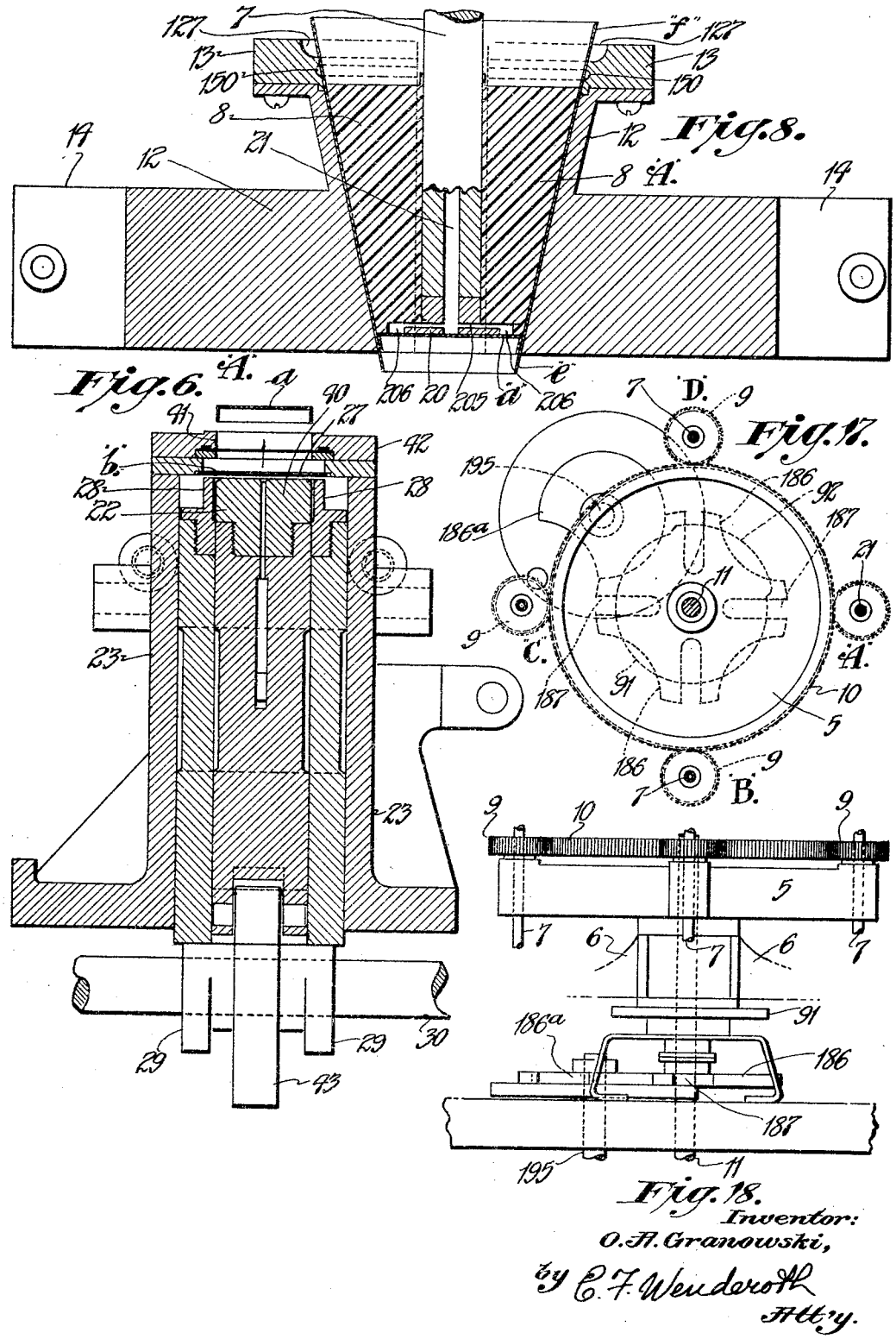

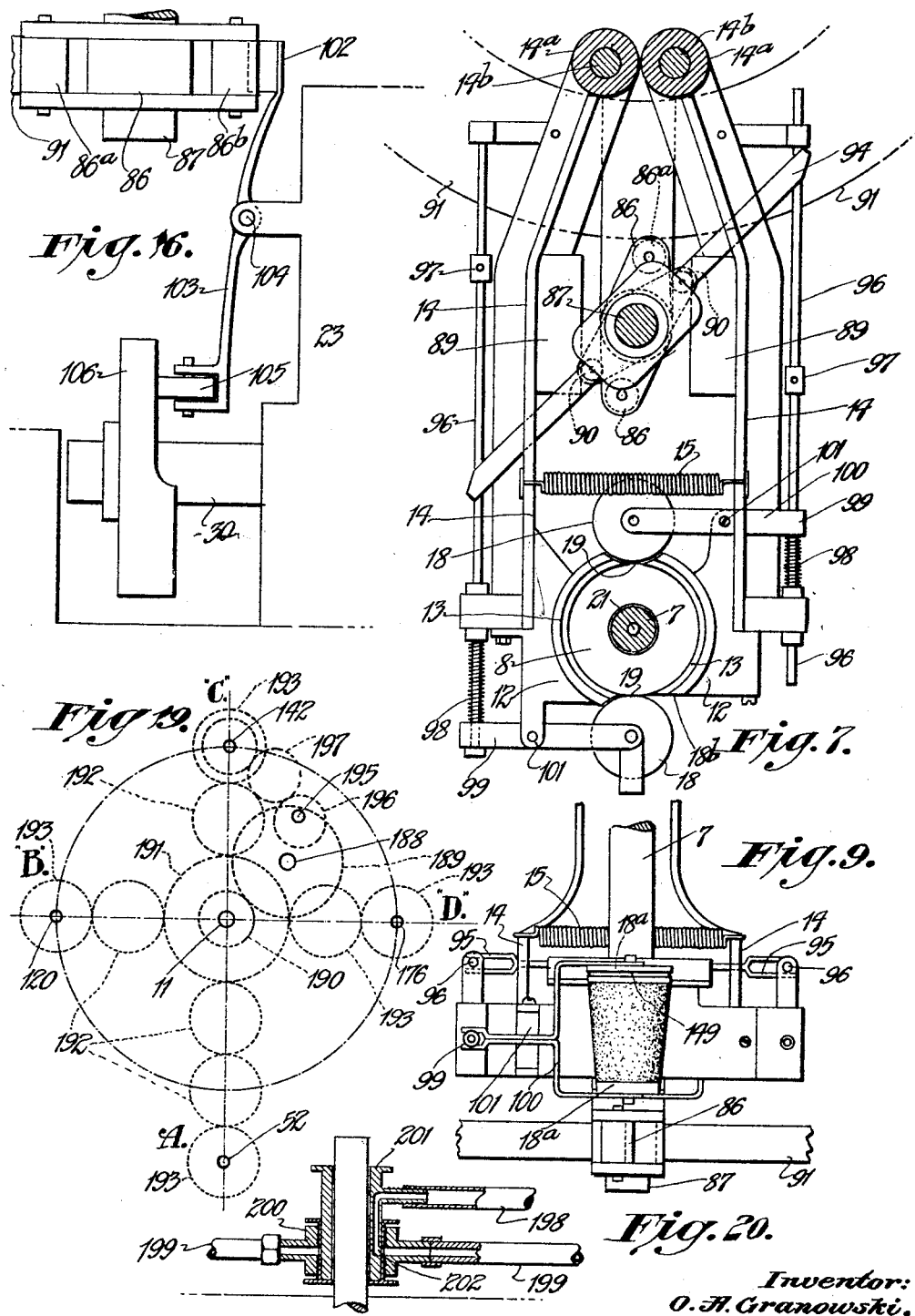

May 30, 1933.  O. A. GRANOWSKI  1,911,313
APPARATUS FOR THE AUTOMATIC PRODUCTION OF
CONTAINERS FROM PAPER AND LIKE MATERIAL
Filed March 10, 1931  10 Sheets-Sheet 7
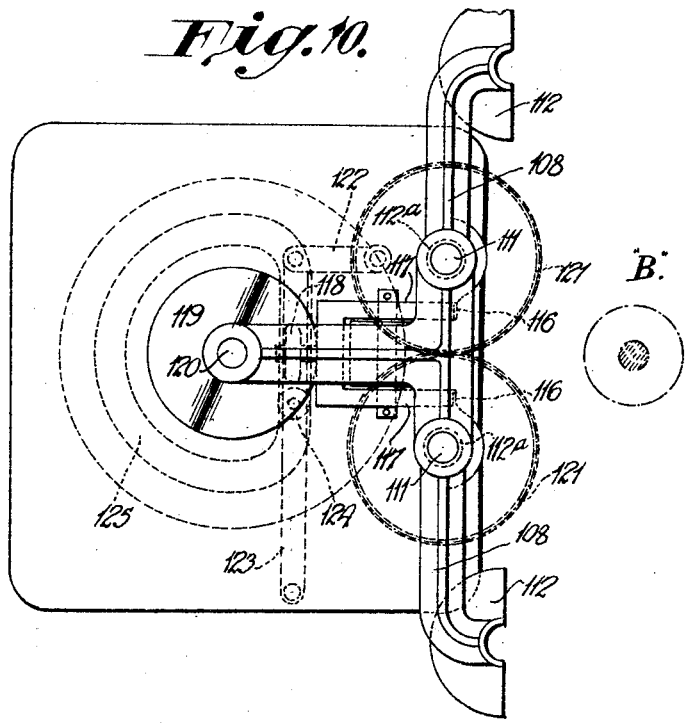
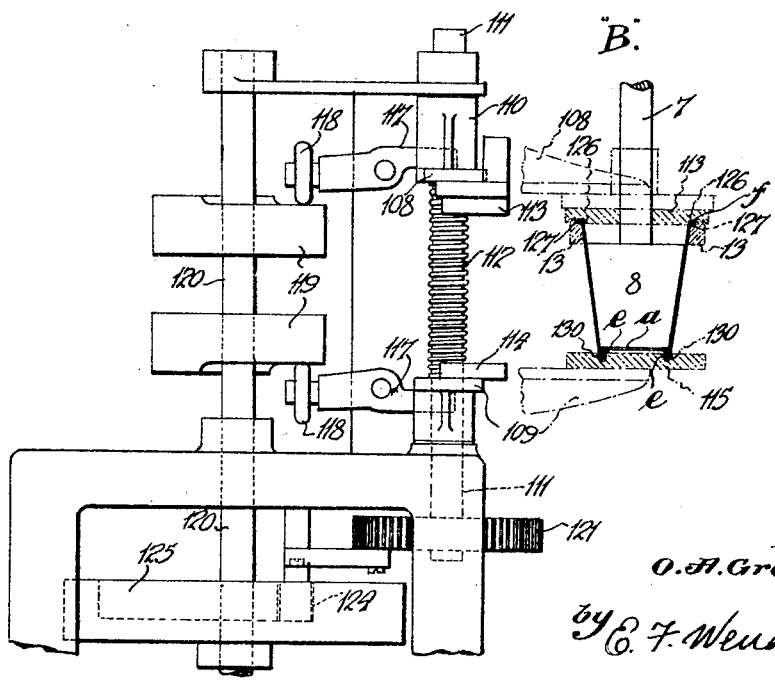

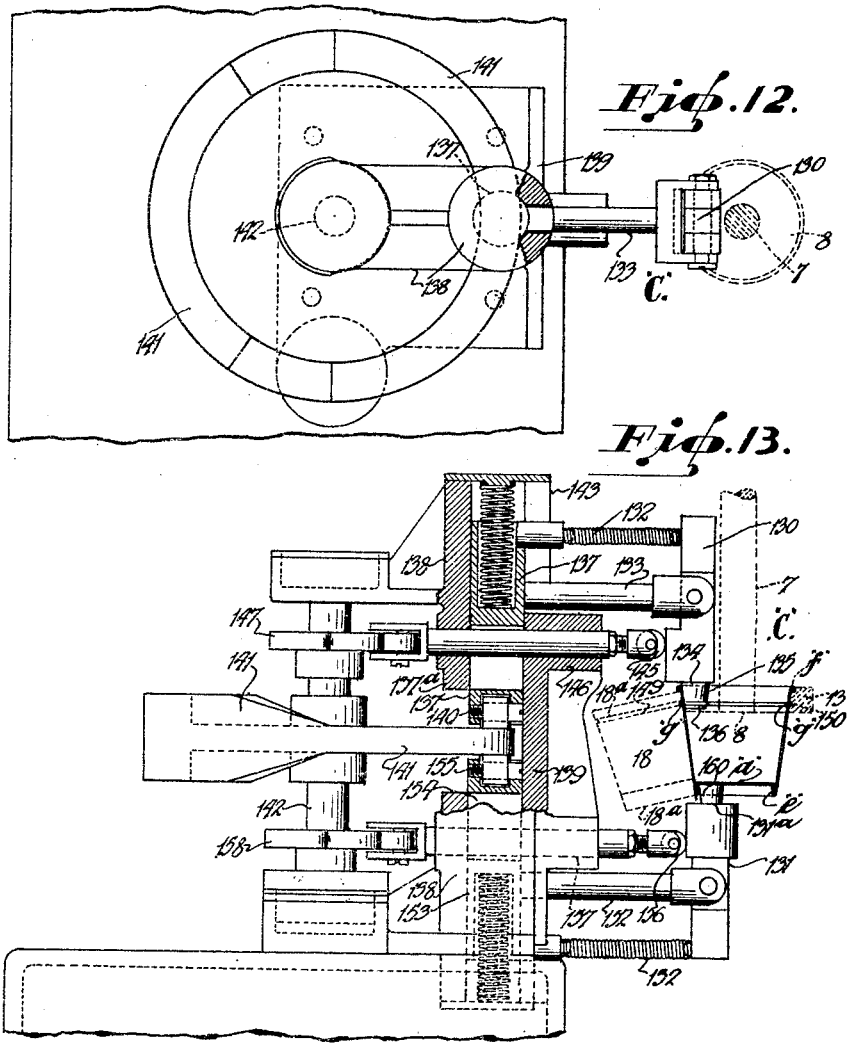

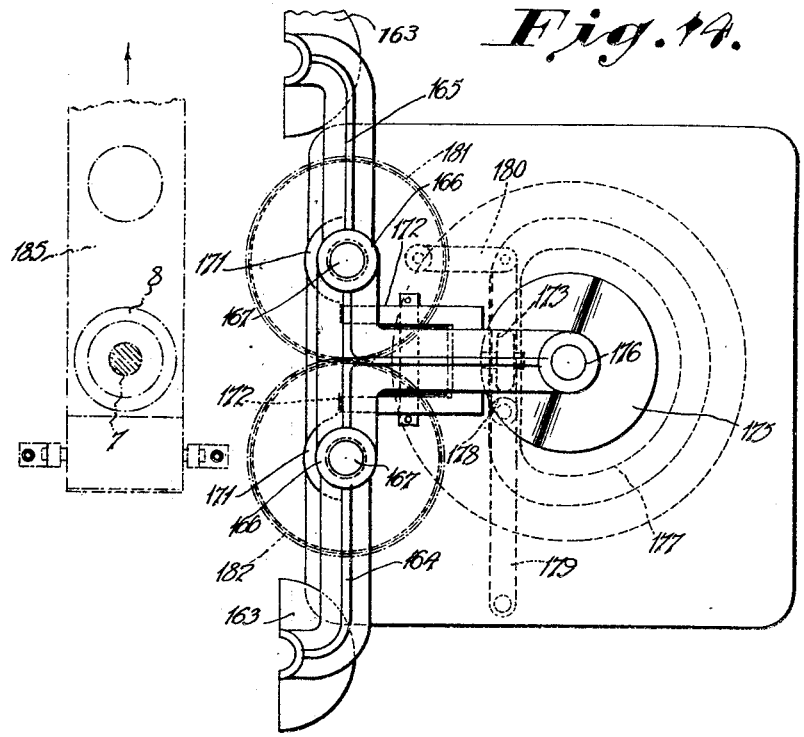
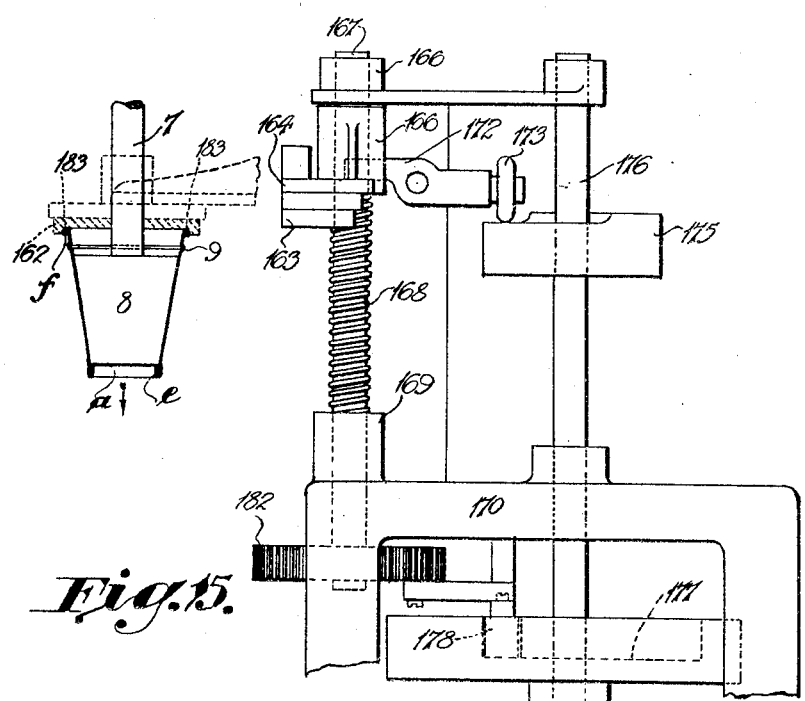

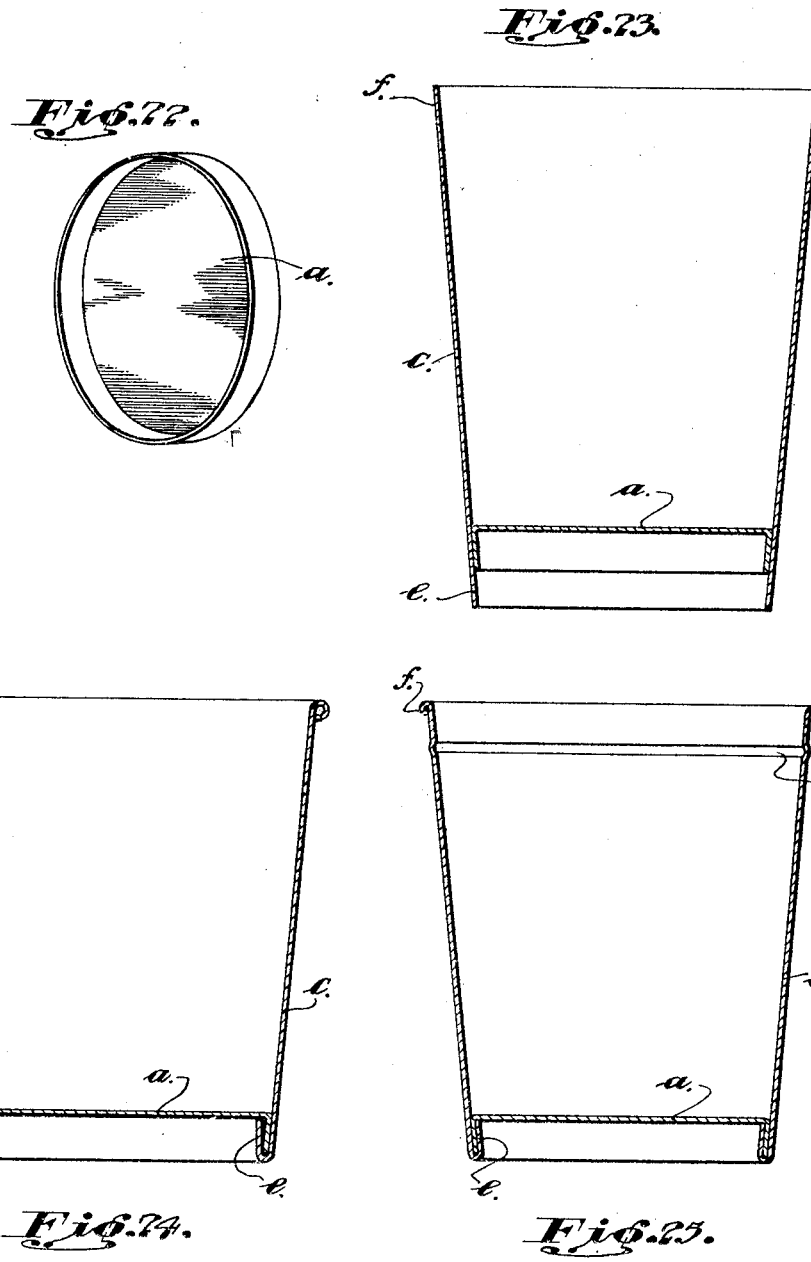

Patented May 30, 1933

1,911,313

UNITED STATES PATENT OFFICE

OSCAR ADOLF GRANOWSKI, OF ABBOTSFORD, NEAR MELBOURNE, VICTORIA, AUSTRALIA

APPARATUS FOR THE AUTOMATIC PRODUCTION OF CONTAINERS FROM PAPER AND LIKE MATERIAL

Application filed March 10, 1931, Serial No. 521,589, and in Australia March 13, 1930.

This invention has reference to apparatus for the automatic production of paper containers such as drinking cups, jam jars, ice cream containers and other vessels which when constructed from paper and by use of the apparatus to be described, being characterized by their cheapness to manufacture, rigidity, strength, appearance and utility.

It will be noted that I refer to my container as being manufactured from paper but I desire it to be understood my invention refers specifically to a mechanical means for producing containers or other vessels or articles irrespective of the material from which the said containers or vessels are made, for instance, as an illustration it may be necessary to make vessels or containers from material such as cellophane, celluloid or a gelatinous material not necessarily paper according to the requirements of the user.

Paper vessels of this description have been produced all over the world for some years. It has been realized by the trade, however, that a considerable reduction in selling price would immensely increase the sales as the ruling prices of the day are very high for this type of article. Every effort has been made to increase efficiency with this end in view and many vain attempts have been made to produce an automatic machine which is the ideal form of production. The physical proportions of the paper and the particular form of the container present difficulties which up to now have been insurmountable when attempting to produce automatic machinery for this purpose.

I desire it to be understood that the description contained herein merely sets forth one application of my invention and that I reserve the right to use mechanical equivalents without departing from the broad features of my invention.

Machines constructed in accordance with the present invention may, with slight modifications, be adapted to manufacture ware of any size and shape, and therefore, while I will describe a machine for manufacturing say, drinking vessels, it must be understood that this is but one application of the invention and must not be construed as the only application to which the invention may be put.

For instance, the machine as described produces a container with the top edge rolled outwards. This edge may, however be turned inwards and rolled hard so as to produce a shape similar to a glass tumbler or it may have a screw thread formed on the top to take a screw or other lid; furthermore, a roll of paper could be utilized for the body blanks in such a manner that the paper is fed through a punching die and the blank so formed is fed past the gummer and thence to the body forming mandril.

Apparatus as concerned in my invention comprises means in combination whereby the bottom wad of a container is formed by any suitable means and caused to be so positioned that a container body is wrapped or otherwise disposed about the bottom, such operations being performed without any interchange of tools as is necessary in existing apparatus and therefore the basic principle of my invention comprises a step in the manufacture of containers in which the bottom wad is made and surrounded by a body portion, the two integers forming the container being brought together by any suitable means.

The invention consists in forming a wad with a depending flange, positioning the wad so that it is retained in position preparatory to receiving the body of the container which is formed by wrapping a blank about a body forming mandrel and about the wad, turning the body inwardly to engage with the flange of the wad, forming the top of the container with means to receive a closing wad and for reinforcing the mouth of the said container.

The invention contemplates first providing means for cutting and shaping a wad from a strip of paper, means for projecting said wad to abut against the lower end of a body forming mandrel, means for passing a blank to the body forming mandrel and means for forming the body about the wad, means for retaining the said wad permanently in said body portion, means for reinforcing and forming the top of the container to receive a lid or closure cap and means for ejecting the finished container and waxing and packing same in any suitable manner.

The object of this invention is to automatically construct a container by means of firstly forming and positioning a bottom portion of the container on one of a plurality of continuously rotating mandrils which have associated therewith divided holders or guides and front and rear frictional pressure rollers which rotate in unison with the mandrels, whereby when a gummed body blank is delivered to the mandrel the said blank is passed between the outer pressure roller and the mandrel and guided around the said mandrel by means of the divided holders or guides and the rear pressure roller, the rotation of the said mandrel and rollers being such that the said blank is shaped and wrapped to conform with the shape of the mandrel to form the hollow body of the container around the previously formed bottom portion.

Another object of this invention is to provide a machine or apparatus of the type described to considerably cheapen and simplify the cost of production of containers manufactured in this manner and wherein the machine is intermittently operated in a step by step manner in synchronization with mechanism which firstly forms a flanged bottom of the container and also in synchronization with co-acting radial suction arms which select a body blank from a magazine, pass the said blank to a gumming means and thence to one of a set of continuously rotating mandrels mounted on the machine and to which the previously formed bottom is attached, the body blank then conforming to the shape of the rotating mandrel and is thereby wrapped around the said bottom portion, the machine in its step by step rotation passing the mandrel with the united portions of the container thereon to synchronized stations during which coacting tools operate on the top and bottom of the container to fold or roll same to complete the finished article for ejection from the mandrel and as herein described, the container is fully fashioned and formed on the one mandrel without having to change or be removed to another mandrel or holder for finishing purposes, the finished or completed container on being ejected from the mandrel being then ready for waxing, packing or storing.

A further object of this invention is to provide apparatus having a single intermittently operable table formed with a plurality of radially arranged arms supporting continuously rotating mandrels fitted with divided holders and tools, said table in a first intermittent step being adapted to position one of the mandrels to firstly receive a flanged wad to constitute the bottom of a container, the mandrel also receiving at this position a body blank delivered thereto by radially arranged coacting suction arms operated in an intermittent and synchronized manner with the table, whereby the body blank conforms to the shape of the mandrel and is also wrapped around the bottom portion, the next intermittent step of the machine being adapted to position the mandrel with the container thereon in registration with coacting halved tools, the respective sections of which unite to roll the upper edge of the container and fold in the lower edge thereof around the flange of the wad constituting the bottom of the container, the next intermittent step of the machine being adapted to position the mandrel in relation to a further set of coacting tools to block and finally roll the top and bottom of the container and form an annular groove in the top thereof to receive a closure wad or cap, these latter tool operations completing the formation of the container on the mandrel so that on the next intermittent step of the machine the mandrel is positioned in relation to a tool for ejecting the finished container therefrom on to an endless band or conveyor for transference to a packing or waxing machine.

A further object of the invention resides in the formation of a container in the manner described wherein the said container is completely formed in a series of operations on one of a plurality of continuously rotating mandrels carried on the radially arranged arms of a single intermittently operated table.

A further object of this invention is to provide a series of suction arms intermittently operated in synchronization with the table of the machine, said arms operating in conjunction with an initial suction arm which selects and withdraws a body blank from a magazine, which is then picked up by one of the radial suction arms and in one step delivered to co-actuated means for imparting a gum strip along one of the edges of the selected body blank which in the secondary step by the suction arm is delivered to one of the continuously rotating mandrels carried on the intermittently operated table which is then stationary to position the mandrel to receive the body blank from the suction arm.

A further object of the invention is to provide the intermittently operated table with radial arms carrying spindles upon which are mounted body forming mandrels having means incorporated therewith to continuously rotate same, said arms being in vertical alignment with coacting jaws under spring control and fitted on their extremities with divided holders or guides and dies or tools normally closed around the body forming mandrel, the divisional space between the holders being utilized as a contact space for yielding friction or driven rollers rotating in unison with the said mandrel on each side thereof, means being employed to open the said jaws at certain periods and to disengage the holders or guides and dies together with the friction rollers from the body forming mandrel.

Other objects of the invention including the provision of the respective tools and dies to operate on the container during the periods between the intermittent steps of the machine will be apparent from the following description in relation to the drawings.

Now in order that the invention may be more readily understood reference will now be made to the accompanying drawings which is one method of carrying out my invention and in which:—

Figure 1 is a perspective view illustrating the apparatus taken from the front thereof.

Figure 2 is a similar view taken from one side of the apparatus with the timing gear of the feed-in mechanism removed.

Figure 3 is a plan view of the feed-in mechanism for transferring the blanks to the body forming mandrils, and Figure 4 is a side elevation thereof.

Figure 5 is a detail of the gumming means or apparatus.

Figure 6 is a central section of the combined punching and blocking die for forming the flanged bottom of the container.

Figure 7 is a detail plan of the co-acting jaws carrying the divided formers, tools and friction rollers.

Figure 8 is a central section of the mandril, divided formers and tools carried by the co-acting jaws.

Figure 9 is a front elevation of the co-acting jaws and members supported thereby.

Figure 10 is a plan of the apparatus for simultaneously folding the top and bottom of the container, and Figure 11 is a detail side elevation thereof and partly in section.

Figure 12 is a plan of the apparatus for grooving the top of the container for the reception of a closure wad and simultaneously blocking the flanged bottom and body of the container together.

Figure 13 is a side elevation of Figure 12.

Figure 14 is a plan view of the ejecting apparatus for discharging the finished container from the mandril, and Figure 15 is a side elevation thereof.

Figure 16 is a side elevation of the pivoted and curved track adapted to maintain the co-acting jaws open during the punching and blocking action of the flanged bottom of the container.

Figure 17 is a detail plan view of the rotary table and fixed cam track, and

Figure 18 is a fragmentary side elevation thereof showing the drive for imparting the intermittent motion to the table carrying the body forming mandrils.

Figure 19 is a diagrammatic plan view of the driving means for synchronizing the various operations with the intermittent stops or pauses of the rotary table.

Figure 20 is a detail view of the suction means employed in conjunction with the apparatus.

Figure 21 is a detail view of the carrier or trough containing the blanks from which the body portion of the container is formed.

Figure 22 is a perspective view of the cup bottom,

Figure 23 is a vertical cross-sectional view of the cup,

Figure 24 is a similar view to Figure 23 showing the turned-in bottom portion and the bead at the top, and Figure 25 is a vertical cross-sectional view of the complete cup.

According to this invention a rotating table 5 is provided having means to intermittently operate same, the table comprising arms 6 of equal radius each of which supports a vertical spindle 7 carrying a body forming mandril 8 below the arms 6.

The mandrils 8 are of the required shape and are continuously rotated by traveling pinions 9 carried on the upper end of the spindles 7 above the table 5, said pinions 9 meshing in travel with a central driving pinion 10 mounted on a vertical spindle 11 extending through the table 5 which is freely mounted thereon and depending on intermittent timing gear for its action as will be hereinafter described.

The body forming mandrils 8 have associated therewith divided formers 12 having fitted thereon similarly divided tools 13 shaped to perform the fashioning of the top of the container, the said formers and tools being carried between co-acting jaws 14 which are retained in the closed position by springs 15, the said jaws 14 being pivoted independently to the body 16 of the table 5 below the arms 6 in radial alignment therewith and move relatively step by step with the intermittent motion of the said rotary table 5.

Pivotally mounted at the front and rear of each mandril 8 in conjunction with the co-acting jaws 14 are yielding rollers 18 in frictional contact, and rotating in unison, with the mandrils 8, the divisional space 19 between the divided formers 13 and tools 14 being utilized as the contact medium between the said rollers 18 and mandril 8, the rollers 17 depending on their position and operation from the co-acting jaws 14.

As each co-acting jaw 14 is pivoted independently on the table 5, the said jaws may be forced apart against the tension of the springs 15 by cam action whereby the divided formers 12 and tools 13 are moved apart from each side of the constantly rotating mandril 8 together with the yielding and frictionally driven rollers 18 which are also disengaged from the mandril 8 and it is a feature that the jaws 14 are open during the initial step of forming the container as indicated at station A.

Station A indicates the position for performing the initial step of firstly forming a flanged wad "a" from a strip of paper "b" as the bottom of the container, placing the flanged wad on the base 20 of the rotating mandril 8 then free from contact with the divided formers 13 and tools 14, and friction rollers 18 whereby after the said flanged wad "a" is placed in position the jaws are timed to close and clamp the formers and tool in position around the mandril 8 to which is then fed a shaped blank "c" to form the body of the container that is spun by the said mandril around the flanged wad "a" which is maintained in position until the closing of the jaws by suction exerted through the bore 21 of the mandril spindle 7.

The apparatus for executing the above operations comprises essentially a combined punching and blocking die 22 housed in a casing 23 mounted in a recess 24 formed in the frame platform 25 upon which the whole apparatus is disposed, the combined punching and blocking die 22 being positioned in vertical alignment below the rotating mandril 8 in its first stop during the intermittent motion of the rotary table 5.

Paper of the required width and thickness in a continuous strip is fed upwardly from the frame platform 25 into a transverse slot 27 formed in the casing 23, to extend across the path of a cutting or punching die 28, operated by spaced quick motion cams 29 carried on a horizontal timing shaft 30 which extends through the bottom of the casing 23.

The timing shaft 30 is driven by bevel pinions 30a from a vertical timing shaft 52 as illustrated.

The paper is stepped in its movements by means of a ratchet 31 and pawl 32, the ratchet 31 being mounted on the spindle 34 of a tensioned roller 35 and fitted with an actuating lever 36 pivoted through links 37 operatively connecting a cam 38 carried on the timing shaft 30 whereby the tensioned rollers draw the paper into position by steps for each cutting action of the punch 28 and then draw out the remaining mutilated paper.

The punch 28 in its upward movement cuts out a disc of paper from the continuous strip after which the blocking die 40 rises and forces the said disc through a reduced opening or forming bore 41 in the casing head 42 which produces an annular or circumferential flange on the disc, the said flange being downturned around the head of the blocking die 40 which continues its upward lift through the head 42 of the casing 23 to place the flanged wad "a" now formed on to the base 20 of the rotating mandril 8, the suction from the spindle 7 thereof removing the said wad from the blocking die as it commences to lower and retains it in position until the co-acting jaws 14 close to clamp the divided formers 12 around the mandril 8 which then hold the wad "a" in position.

The blocking die is actuated by a delayed action cam 43 disposed on the timing shaft 30 between the cams 29 operating the punch 28, the actions of the cams 29 and 43 being such that the punch operates to sever the disc of paper on the completion of which the blocking die 40 lifts to form the flange on the said disc and place it in position on the base 20 of the mandril.

It will now be understood that the reason for providing the clearance around the rotating mandril 8 by maintaining the co-acting jaws 14 open, is to permit the rise and fall of the blocking die 40 which on depositing the flanged wad in position on the base 20 of the mandril recedes into the normal position within the casing 23 after which the co-acting jaws 14 are timed to close to clamp the divided formers 12 and tools 13 together with the friction rollers 18 around the said mandril 8 and maintain the flanged wad "a" in position on the base 20 thereof.

The table 5 is still stationary and the rotating mandril 8 with the flanged wad "a" in position on the base thereof is then ready to receive a shaped blank to form the body of the container.

In feeding a blank to the mandril 8, the said blank in two movements is first selected from a trough or carrier 45 supported at an inclination to the platform 25 and then delivered to the gumming apparatus to apply a gum strip "d" to an inside edge or suitable portion of the blank "c" which in the final movement is transferred to the mandril 8 passing between the outer friction roller 18, the inlet edge of the formers 12 and tools 13 being chamfered as at 18a to guide and permit the ready insertion of the blank "c" between the adjacent outer friction roller 18 and the mandril 8.

It is a feature that the timing gear to produce the intermittent steps necessary to feed the gummed blank "c" to the mandril 8 is such that the two stepped movements are necessary to achieve this to one stepped movement of the table, so that the mandril, though rotating, is still stationary in relation with the table 5 when the blank is delivered thereto.

The blank is delivered by one of a series of co-acting suction arms 47 radially arranged and emanating an angle of 120° from the boss 48 of a star wheel 49 driven in the usual manner by rollers 50 disposed on a collar 57 mounted on the upper end of a vertical driving spindle 52, this orthodox timing gear providing the necessary intermittent motion to the suction arms 47 in the desired ratio and in synchronization with the intermittent steps of rotary table 5, the spindle 48a of the wheel 49 being stationary and bored out as at 48b to receive the suction for the radial arms 47.

Disposed on the vertical spindles 52 is a pinion 54 meshing with a pinion 55 carried on an adjacent spindle 56, which below the pinion 55 is fitted with an eccentric 57, the arm 58 of which pivotally connects a vertical actuating lever 59 pivotally engaging with a rack 60, the outer end of which is plain and extends to connect an alternating suction arm 62 having a two port suction end 63.

The suck on this arm 62 is alternating and is controlled by a valve 64 in tubular or like connection with the arm 62.

The initial suction arm 62 is in vertical alignment with radial suction arm 47 as each of these radial arms in turn co-acts with the initial suction arm 62 to select a blank "c" from the carrier 45 as will be described.

Each suction arm 47 in turn with the suction arm 62 is directed in radial alignment towards the blank carrier 45, the throw of the eccentric 57 being set to cause the initial suction arm 62 through the members above described to extend into the carrier 45 and partly compress the blanks "c" therein as the said blanks are perfectly disposed on a sliding platform 66 in the base of the carrier which is mounted on rollers 67 to provide a yielding effect.

The action of the valve 64 is such that the suction arm 62 in its forward throw is under suction and after the partially depressing action on the blank is withdrawn by the action of the eccentric 57 the graduated or stepped portions 71 of the carrier opening or front 70 ensuring that resistance is offered to the removal of extra blanks from the carrier whereby one blank only is drawn through the said graduated opening 70 of the carrier 45.

The return throw of the suction arm 62 draws the blank in to a position adjacent and in angular alignment with the two port suckers 74 disposed on the outer end of each radial and coacting suction arm 47.

The suction on the initial arm 62 is then cut out by the valve 64 and at the point of contact the blank is then transferred to the suckers 74 on the upper radial arm 47 which has a continuous suck.

The blank being drawn on to the upper suction arm 47 is then delivered to gumming apparatus for imparting a gum strip to one of the inside seam edges of the blank.

The gumming apparatus comprises essentially a reciprocating rack 75 having formed thereon a rectangular metal shoulder or section 76 arranged at an inclination as illustrated, the rack operating in conjunction with rollers 78 in engagement and disposed in a bath 79 containing a liquid adhesive such as dissolved gum.

The rack 75 is operated and timed by a pinion 75a in engagement therewith and mounted on a flexible shaft 80 extending from a pinion 81 in engagement with the rack 60 actuated by the eccentric 57 so that the motion of the reciprocating rack 75 carrying the metal section 76 is timed in synchrony with the movements of the co-acting suction arms 47 previously described.

The disposition of the outer roller 78 is such that it projects over the edge of the bath 79 whereby the rack in its downward movement impinges the metal section 76 against the said roller which rotates and receives a coating of gum or other adhesive from the adjacent engaging roller, the metal section 76 finishing its movement below the said roller and on its upward movement on the return of the rack 75 again impinges on the outer overlapping roller 78 and receives a coating of gum or liquid adhesive evenly over its surface.

The rack 75 is bored out to receive a suitable heating element such as 83 adapted to maintain the adhesive coating on the metal section 76 at the correct temperature until the said adhesive is imparted to the inside seam edge of the blank.

The return of the metal section 76 with its coating of liquid adhesive in coincidence with the termination of the first intermittent step of the upper suction arm 47 carrying the previously selected blank "a" which is then in a position to receive a gum strip on one of its inside seam edges by means of its contact with the metal strip 76 which imparts its coating of gum to the particular edge of the blank.

The gum strip "d" imparted to the seam edge is of limited length equal to the length of the metal section 76 whereby a clearance is left between each curved side of the blank to permit the various folding and blocking actions to the container after the body has been formed from the blank.

To ensure that positive and even contact is achieved between the blank and metal strip or section 76 to facilitate the gumming action, at the period of contact, a pusher arm 85 exerts a pressure on the back of the blank adjacent the seam edge to bring it into definite contact with the said metal section 76, the pusher arm being timed to reciprocate from a cam 86A carried on the spindle 56 below the eccentric 57 previously described.

After the blank has had the gum strip "$d$" imparted thereto in the manner described the radial suction arm 47 to which it is held swings inwardly in a second intermittent step and delivers the blank to the chamfered inlet edge 18a of the divided formers 13 around the rotating mandril 8 between it and the adjacent outer roller 18 and in this position the suction on the arm 47 is reduced which allows the blank to be swept into and around the mandril 8 between it and the divided formers 13 without any misalignment.

This delivery of the blank to the mandril 8 taking place prior to the table 5 commencing its next stepped movement which then occurs simultaneously with the continued radial movement of the suction arm 47 which thus ensures that no fouling of the operative members takes place.

The rotation of the mandril 8 and friction rollers 18 effects the forming of the body of the container from the shaped and gummed blank "$c$" delivered thereto by the radial suction arm 47, the formation actually occurring by the spinning action of the rotary members described between the divided formers 12 which also serve to effect the gumming together of the seams of the blank while forming the body portion.

In this manner the body portion of the blank is formed on the mandril 8 with the lower periphery of the said body portion extending around the flanged wad "$a$" previously held in position by suction to the base 20 of the said mandril 8 and constituting the bottom of the container as previously described and this forms a very essential feature of the invention.

An annular clearance of material "$e$" is left below the flange wad "$a$" on the lower periphery of the body portion "$c$" while the container at the top is left with a similar clearance of material "$f$" above the level of the mandril for the purposes of reinforcing the said top and bottom of the container in series of operations during the synchronized pauses or stops in the rotation of the table 5 as will be hereinafter described.

As all the sets of co-acting jaws 14 are similar in construction and operation one set only will be described in detail.

The co-acting jaws 14 depend on their action from spaced rollers 86 disposed below the said jaws 14 and coupled by links to a vertical spindle 87 supported at the top by the aligning quadrant arm 6, the spindle 87 being centrally positioned between the jaws 14 and in radial alignment with the mandril spindles 7.

Each jaw 14 is pivoted independently of and adjacently to its co-acting jaw by means of the inner flanged ends 14a thereof being disposed about rods or pins 14b anchored at their upper ends in the body of the table 5, the said jaws being normally closed by the action of the spring 15 as has been previously described.

The actuating spindles 87 carrying the lower coupled rollers 86 extend through blocks 89 carried on each arm 14, the said blocks 89 being in engagement with a further set of coupled rollers 90 carried on the said spindle 87 and disposed between the blocks 89.

The inner roller 86a of the lower coupled series 86 normally travels as the table 5 moves to the next position around a fixed cam track 91 mounted below the table 5 to maintain the jaws closed while an enlargement or raised portion 92 of the track 91 will cause the inner roller 86a to open the jaws 14 at the predetermined period as the engagement of this roller 86a with the said enlargement 92 effects a partial rotation of the spindle 87 coupled thereto, which thereby causes the upper rollers 90 to move laterally and force the blocks 89 in engagement therewith apart whereby the jaws 14 are opened.

Mounted on the spindle 87 is an arm 94 disposed above the blocks 89 and inclined across the jaws 14, the said arm having bifurcated ends 95 to slidably engage with rods 96 incorporated at each side of the jaws and provided with collars 97, the said rods 96 at the front thereof being spring wound as at 98 and receive the bifurcated sides 99 of brackets 100 which are shaped to support each friction roller 18, the said brackets 100 being pivoted as at 101 whereby on the coupled rollers forcing the jaws apart a corresponding movement is imparted to the bifurcated arm 94 which slidably engages with the rods 96 and collars 97 thereon against the tension of the springs 98 so that the friction rollers 18 by means of the rods 96 engaging with the pivoted brackets 101 are drawn clear of the mandril 8 whilst the jaws are open.

The enlargement 92 on the cam track 91 terminates adjacently the position of the combined punching and blocking die 22 whereby as each rotating mandril 8 moves toward said punch in the initial step "A" of forming the container, the jaws 14 are open and additional timing apparatus is provided for maintaining the jaws open during the punching and blocking action for forming and depositing the flanged wad "$a$" on the base of the mandril 8 as previously described after which the jaws 14 are timed to close around the mandril while the said table 5 is stationary prior to the commencement of the next intermittent step thereof.

This apparatus comprises a substantially small curved track 102 of a radius coincident with the radius of the fixed cam track 91 and positioned in approximately the same lateral level at the back of the punching and blocking die 22.

The curved track is carried on a stem 103 pivoted as at 104 to the casing 23 of the punching and blocking die 22, the stem 103 at the base thereof being fitted with a roller 105 to engage with a cam 106 carried on the timing shaft 30 of the punching mechanism.

Thus as the mandril 8 approaches the initial station "A" the curved track 102 is timed by the cam 106 to swing into the path of the outer roller 86*b* coupled series 86 controlling the action of the jaws 14 and hold it for a period sufficient to permit of the hereinbefore described punching and blocking action of the flanged wad "*a*" to take place, after which the curved track 102 swings back and permits the jaws 14 to close and clamp the divided formers 12 and tool 13 around the said rotating mandril 8 in readiness for the reception of the blank.

Having completed the operations to be performed at station "A" the rotatable table 5 makes a step with the container body formed on the rotating mandril around the flanged bottom "*a*" to terminate in alignment with synchronized apparatus for simultaneously folding the top of the container and blocking the bottom "*e*" of the body portion around the flange of the wad "*a*" constituting the container bottom, these operations being performed as indicated at station "B".

The apparatus at station "B" is timed to operate in synchronization with the stopping of the mandril 8 on the completion of the second stepped movement of the rotary table 5 and comprises spaced upper and lower sets of arms 108, 109 respectively, the inner ends of the arms being formed with bosses 110 to receive spaced spindles 111 which each carry both the aligning upper and lower arms of the sets.

These arms are keyed to their respective spindles in such a manner as to permit of a free sliding movement in a vertical direction.

The spindles 111 between the bosses 110 are spring wound as at 112 while the outer curved ends of each upper arm 108 carrying the halves 112 of the tool 113 for forming the top of the container and the lower arms 109 carry the halves 114 of the tool 115 for blocking the lower periphery "*e*" of the container in and around the flange of the wad "*a*" constituting the bottom of the container.

Each boss 110 is provided with an inward projection 116 adapted to engage with spaced strikers 117, the outer ends of which carry upper and lower rollers 118 operating in conjunction with spaced co-acting cams 119 disposed on a vertical driving and timing shaft 120.

The lower ends of the spindles 111 are fitted with pinions 121 in mesh, one of the pinions having connected thereto a pivoted connecting rod 122 engaging with a link 123 having fitted thereon a roller 124 in engagement with a slotted cam 125 carried on the vertical shaft 120, the action of which is to impart a partial rotation to the spindles 111 to cause the arms to swing inwardly and centre above the top and bottom of the container respectively, after which the co-acting cams 119 through the strikers 117 impart a converging action to the said arm 109, 110 to cause the upper and lower divided tools 113 and 115 respectively to close and unite on the top and bottom clearance portions "*e*" and "*f*" of the container body portion carried on the rotating mandril 8.

The tool 113 then co-operates with the divided tool 13 disposed on the mandril formers 12 to form the fold over of the top of the container and this is achieved by the shaped groove 126 of the tool 113 folding over the top "*f*" of said container into the corresponding but oppositely curved groove 127 disposed in the divided die or tool 13 mounted on the mandril formers 12.

The spinning action of the mandril 8 insuring that a positive fold over of the container top "*f*" takes place in the registering grooves 126 and 127 of the co-operating tools 113 and 13 respectively.

Simultaneously with the folding over or rolling of the top, the divided halves of the lower tool 115 unite and close around the peripheral overlapping or clearance portion "*e*" of the container bottom, the forming groove 130 in the said tool 115 being provided with an outer taper, the inclination of which is such that the said overlapping portion during the spinning action of the mandril is turned inwardly around the flange of the wad "*a*" constituting the bottom of the container to reinforce same.

At the conclusion of the simultaneous tool operations described, the co-acting cams 119 lift the arms clear of the mandril while the lower cam 125 returns the said arms to the normal position to permit of clearance for the rotating mandril 8 and associated parts to commence the next intermittent step with the table 5.

It is a feature that the tools described under the action of the co-acting cams 119 and the cam 125 do not close on the container top and bottom respectively until the table has stopped and reached the predetermined position, when the halves of the tools close and unite to perform the operations described and then lift clear of the container prior to the commencement of the next intermittent movement of the table, which provides a maximum clearance with no fouling of the co-operative members described.

The table then makes a third intermittent step to bring the mandril 8 carrying the container (which now has the top and bottom folded) to a position indicated at "c" where apparatus is positioned to form a groove "g" in the top of the container for the reception of a closure wad and simultaneously block together the previously folded portion "e" of the bottom of the container with the flange of the wad "a" constituting the bottom of the container, the apparatus being timed to synchronously operate with the stopping of the table 5 in this movement which thus brings the mandril 8 into the required position.

The apparatus at Station "C" comprises co-acting tools 130 and 131, both of which are spring controlled as at 132, the upper tool 130 being pivoted on a bifurcated arm 133 and at the base 134 thereof is provided with a roller stem 135 on which is formed a circumferential beading 136 which is adapted to form the groove in the container as will be described.

The tool arm 133 is formed at right angles to a vertical arm 137 extending through housings 138 formed integral with the apparatus frame 139, the said arm 137 below the housing being fitted with a roller 140 adapted to engage with a double action cam 141 carried on a vertical timing shaft 142, the front face 143 of the housing having a slot therein whereby the said arm 137 and tool 133 may rise and fall under the action of the said cam 141.

The tool 130 is pivotally mounted to permit of a limited lateral movement by means of a roller 145 impinging against the front thereof, the said roller being mounted on a rod 146, under the control of a cam 147 carried on the timing shaft 142 above the double action cam 141.

The vertical arm 137 of the tool is slotted as at 137a to provide for the passage of the cam rod 146 therethrough, the said slot 137a being of sufficient length to permit of the rise and fall of the said arm 137 on being operated by the cam 141 without fouling.

Thus when the mandril 8 arrives at the synchronized position and the table 5 is stationary, the tool 130 descends into the top of the container in the manner illustrated, while the beading 136 impinges in the predetermined position on the inside of the container top.

Each outer friction roller 18 at the top and bottom is provided with a metal lining 18a and in the upper lining is formed an annular or circumferential groove 149 which, when the tool is in the operative position is in alignment with the beading 136 of the upper tool 130 whereby as the container is spinning with the mandril together with the friction roller, the beading 136 under the action of the spring 132 presses the paper into the groove 149 in the friction roller and thereby forms a corresponding inside groove "g" in the container top.

During the action of forming the groove 149 by the tool 130 as previously described the spring 132 applies the necessary pressure on the tool to effectively perform the function described and maintain the said tool in the operative position, the lateral movements of the said tools 130, 131 being made against the tension of the spring 132.

The tool is actually positioned to operate in the divisional clearance between the divided formers 12 and tool 13 so that direct contact is made between the paper and the annular groove 149 in the friction roller, while the divided tool 13 carried on the mandril 8 is provided with a lower aligning groove or recess 150 in which the grooved portion of the container spins after being formed in the manner described.

If desired the upper tool 130 in lieu of the beading 136 may be shaped to form a screw thread in the top of the said container for the reception of a screw cap as the closure means.

Simultaneously with the detailed groove forming action described, the bottom of the container is finally blocked around the flanged wad in the bottom thereof, this being performed by the lower co-acting tool 131 which is also pivotally mounted on a right angled arm 152, the vertical portion 153 being similarly slotted as at 154 and at its upper end receives a roller 155 operating on the underside of the double acting cam 141.

The tool 131 has a limited lateral movement by means of a roller 156 adapted to engage therewith and disposed on the inner end of a rod 157 which extends through the housing 138 and the slot 154 in the vertical portion 153 of the tool arm, the rod 157 being controlled by a cam 158 carried on the timing shaft 142.

The lower tool 131 is formed at the top 131a with a reduced portion in the form of a roller stem 160 which actually does the blocking of the bottom of the container as will be described.

Therefore when the tool 131 is timed to operate the cam 141 allows the said tool to rise into position in the bottom of the container adjacent the divisional space between the divided formers 12 and tool 13 and is held therein by the pressure exerted thereon by the spring 132, whereby the roller stem 160 of the tool 131 is brought into action against the inturned and flanged bottom of the container, the pressure from the spring controlled tool being taken by the lower metal lining 18a on the outer friction roller, the spinning action of which combined with the rotation of the container and the spring pressure exerted through the roller stem 160 serves to effectively finish and block the folded bottom portion of the container around the flanged wad "a" constituting the bottom of the container.

Both the grooving and blocking actions performed by the tools 130, 131 in the manner described are simultaneous and on the completion thereof the double action cam 141 by means of the right angled arms lifts and lowers the respective tools 130, 131 clear of the container while the cams 147 and 158 which are actually co-acting by means of the rod attachment move the said tools laterally clear of the respective portions of the container against which they were operating.

In this instance also the rotating table 5 first becomes stationary at its predetermined position, after which the tools 130, 131 are brought into operation by the timing gear described to perform the operations detailed after which the said tools are lifted away from and then cleared from the path of travel of the mandril and associated rotating parts which then move to the next synchronized stop by means of a further intermittent step by the table 5 which brings the rotating mandril supporting the now completed container to an ejection position indicated at Station "D".

Station "D" comprises the apparatus for ejecting the finished container from the mandril 8 which takes place when the mandril stops with the table in the synchronized position with the co-acting jaws 14 in the open position whereby the mandril with the container is rotating freely and disengaged from the divided formers 12 and tool 13, thus giving access for a tool to descend on to the folded top of the container and eject it downwardly off the mandril.

The enlargement 92 on the fixed cam track 91 commences prior to the synchronized stopping position of the mandril 8 with the result that the inner coupled roller 86a disposed on the actuating spindle 87 is forced outwardly and thereby opens the said co-acting jaws 14 for the operation outlined above.

The apparatus at Station "D" comprises a divided tool 162 the halves 163 of which are each carried on the outer ends of spaced horizontal arms 164, 165 formed on their inner adjacent ends with collars 166 through which extend spaced vertical spindles 167 which are spring wound as at 168 between the said collars 167 and the base 169 of the supporting frame 170 of the apparatus.

The collars 166 of the tool supporting arms 164, 165 are provided with projections or extensions 171 directed towards each other upon which strikers 172 repose, the said strikers 172 being operatively connected with a roller 173 in engagement with a cam 175 carried on a vertical timing shaft 176 which below the frame 170 of the apparatus carries a slotted cam 177, the roller 178 of which is attached to pivoted links 179 in engagement with a connecting rod 180 attached to a pinion 181 mounted on one of the spindles 167, the pinion 181 being in mesh with a similar pinion 182 carried on the adjacent spindle 167.

The tool 162 which is halved and disposed on each arm 164, 165 as described when closed to unite each half is formed with an annularly inverted curved groove 183 to correspond with the curl or fold of the top of the container to eject the same from the rotating mandril 8.

The ejection is achieved by means of the arms 164, 165 which are timed to swing inwardly by the action of the lower cam 177 by means of the partial rotation imparted through the pinions 181, 182 to the spring wound spindles 167 while the converging and lowering action is imparted by the upper cam 175 through the roller 173 causing the strikers 172 to depress the said arms, these actions being synchronous to unite and close the divided halves 163 of the tool 162 around the top of the container, whereby the inverted curved groove 183 in the tool centres on the curl or fold on the top "f" of the container and the continued pressure thereon combined with a further limited downward movement by the said tool 162 causes the finished container to be ejected downwardly off the mandril 8.

The ejected container falls or drops on to an endless belt or conveyor 185 disposed below the mandril 8 and mounted on the platform 25 of the main frame supporting the whole apparatus.

This conveyor 185 may be of continuous or intermittent motion to carry the container into a bath containing any suitable means for waxing the said containers or any other suitable surfacing medium may be applied thereto after which the containers are delivered by a further conveying system to suitable packing means.

As has been previously described the rotary table 5 is intermittently operated to effect a series of stepped movements with pauses or stops between each movement during which the synchronized operations are carried out while the said table is stationary as the body forming mandrils are always rotating, the cycle of operations being performed in turn at the indicated stations "A", "B", "C", "D", whereby as the apparatus is operating each station operates in unison therewith so that as a blank is being fed in to form a container at the station "A" a finished container is being ejected from the mandril at the Station "D", the cycle being continuous during the rotation of stepped movements by the table 5.

The rotary table 5 although disposed around the central spindle 11 driving the gearing for the mandrils is freely mounted thereon and is actually coupled to the star wheel 186 forming part of the main timing gear for imparting the intermittent motion to the said table 5.

As illustrated the said timing gear 186a consists in the orthodox timing movement known as the Geneva movement and in this instance embodies four radial slots 187 in the star wheel to provide a corresponding number of stops for the various operations to be performed at the stations indicated.

Figure 19 shows a diagrammatic layout of the timing drive imparted from the power driving shaft 188 which has a pinion 189 of a predetermined speed mounted thereon to mesh with a pinion 190 carried on the central vertical spindle 11 from which the mandrils 8 are driven in the manner described, above the pinion 190 is a further gear wheel 191 of lesser speed around which idler gears or pinions 192 are spaced to gear with the driving pinions 193 carried on each of the vertical timing shafts 52, 120, 142, 176 for the cam controlled movement at each of the Stations "A", "B", "C", "D".

The driving pinions are of equal diameter so that a constant and uniform timing of all the movements is achieved in synchronization with the intermittent motion of the table 5 as the timing gear 186 thereof is driven by a spindle 195 having a pinion 196 thereon in mesh with an idler gear 197 driven from the driving pinion 142 as illustrated in Figure 19, the whole being arranged and operating to synchronize the timed movements of the co-operating apparatus embodied in the assembly to function during the intermittent stops or pauses of the rotating table 5.

The drawings illustrate one means of supplying suction to the mandrils 8 in the initial step when it is necessary to draw and maintain the flanged wad for the bottom of the container against the base 20 of the mandril.

Suction is supplied by an inlet pipe 198 leading from a pump or like supply to the series of radially arranged suction arms 199 in coincidence with the radial arms 6 of the rotary table 5, each suction arm leading from a rotary distributor 200 moving in unison with the table 5, the distributor being disposed around a fixed sleeve 201 in communication with the suction inlet pipe 198, the said sleeve 201 having an outlet port 202 adapted to register with each radial suction arm 199 in turn when it occupies a position relative to the position "A" where suction is applied to the flanged wad.

The outer end of each radial arm is formed with a union 203 in engagement with the union 204 at the top of the vertical aligning mandril spindle 7 which is provided with a central bore 21 and a spreader 205 at the base 20 of the mandril 8 which has a plurality of suction ports 206 to exert an even suck over the whole surface of the flanged wad.

This suction is supplied from the outlet port 202 in the fixed sleeve 201 through the rotary distributor 200 into the aligning radial suction arm 199 and thence through the bore of the mandril spindle 7 to the spreader ports 206 on to the flanged wad.

A branch 208 of the inlet suction pipe 198 leads to the bore 209 of the timing wheel 49 carrying the radially arranged suction arms 47 utilized to gum and feed in the blank to the mandril 8, ports 210 being incorporated in the boss of the wheel 49 to supply a continuous suck to the arms 47 when picking up the blank, gumming and whilst carrying it to the point of deliverance to the mandril 8 after which the suction is cut off from the said arms.

The valve 64 regulates the alternate suck to the initial co-acting arm 62 in the manner hereinbefore described.

The apparatus hereinbefore described thus apprehends the use of an intermittently operated table carrying a set of continuously rotating mandrils for forming the body of the container by a spinning action, the stops or pauses between the intermittent steps of the table being adapted to synchronize with the cam controlled operations necessary for forming the bottom and then wrapping or forming the body of the container around the bottom, folding or rolling the top and bottom of the container, grooving the top of the container and blocking and finishing the bottom of the said container and then ejecting the said finished container from the mandril on to a conveyor for further finishing treatment.

The number of steps in forming a container according to my invention are consequently greatly reduced and with less operations thereon a greatly improved finished product is achieved as less wear takes place on the paper, while the constant spinning of the mandrils between the associated formers ensures that the containers are accurately and expeditiously shaped.

I do not wish to be limited to the precise shape of the tools or mandrils and associated parts described and illustrated as same may require to be varied to suit various shapes and types of containers.

I do not wish to be arbitrarily confined to the hereindescribed details but desire it to be understood that various suitable working modifications may be embodied throughout the invention without departing from its spirit and scope.

What I claim as my invention and desire to secure by Letters Patent is:—

1. In apparatus for the automatic production of paper or other containers, a single intermittently operable table having a plurality of radially arranged arms carrying continuously rotating mandrels fitted with divided holders and molding tools and driven pressure rollers, coacting suction arms intermittently operable in synchronism with the mandrel table to select a blank and pass it to gumming means and thence to one of the rotating mandrels having positioned thereon a previously formed bottom portion whereby the body blank is wrapped around the said bottom portion, the table intermittently moving the said mandrel having the partly formed container thereon to a series of selected positions, co-operative tools at each selected position operating in synchronism with the termination of each intermittent movement of the table to respectively, simultaneously fold the bottom peripheral edge of the container around the bottom portion and roll over the upper extended peripheral edge of the container and simultaneously form an annular internal recess in the previously rolled top of the container and finally block the folded bottom of the container and then eject the finished container from the mandrel.

2. In apparatus for the automatic production of paper or other containers, a single intermittently operable table having a plurality of radially arranged arms carrying mandrels, means to continuously rotate the mandrels, radially arranged suction carrier arms, emanating at an inclination from the boss of a star wheel carried on a timing shaft, driven in unison with the mandrel table to intermittently operate the radial suction arms in synchronism therewith, an initial co-acting suction arm to select a blank from a magazine and position it to be picked up by one of the radial suction arms, the said arm in two intermittent movements passing the selected blanks to gumming mechanism and then to the delivery position of one of the continuously rotating mandrels of the table which is stationary to position the mandrel to receive the said blank.

3. In apparatus for the automatic production of paper or other containers comprising an intermittently operable table having a plurality of radially arranged arms, driven spindles supported by the arms, body forming mandrels mounted on the spindles, spring controlled and expandable jaws independently pivoted to the table in vertical alignment with the said arms, divided holders on the outer extremities of the jaws to normally close around the mandrels, divided molding tools on the upper surface of the holders, a divisional space between the said holders to permit of contact between frictional pressure rollers and the sides of the mandrels and means to expand the said jaws at predetermined positions to disengage the divided holders and tools and pressure rollers from the mandrels.

4. In apparatus for the automatic production of paper or other containers, reciprocating and independently operating punch and sleeve mechanism to sever a blank from a strip of material, form an annular depending flange on the blank, and then move the said blank so as to engage with the end of continuously rotating mandrel, suction means within the mandrel to retain the blank in position preparatory to receiving a body blank delivered to the said mandrel by co-acting suction arms, which are adapted to pass the body blank between an outer pressure roller and the mandrel, divided holders associated with the mandrel to guide the body blank around the mandrel surface, closable jaws operating in conjunction with the mandrel and carrying the divided holders and pressure rollers and means to expand the jaws at selected positions to disengage the associated mechanisms from the mandrels.

5. In apparatus for the automatic production of paper or other containers, a table having a plurality of intermittently operable carrier arms, a continuously rotating mandrel supported by each arm, pressure rollers rotating in unison with each mandrel, divided holders and molding tools disposed around the said mandrels, spring controlled jaws in vertical alignment with the carrier arms to carry the associated mandrel mechanisms, the said carrier arms being adapted to move step by step to selected positions in order to impart the bottom forming operation and the reception by the bottom portion of the body of the container, the preliminary folding of the top and bottom extended peripheral edges of the container body portion, the final folding operation and internal groove forming operation in the folded top of the container and finally the ejection of the finished container respectively.

6. In apparatus for the automatic production of paper or other containers, rotating mandrels, pressure rollers rotating in unison with each mandrel, divided holders and molding tools disposed around said mandrels, co-acting jaws, means to expand said co-acting jaws to disengage said divided holders and said molding tools and said pressure rollers from said continuously rotating mandrels during the initial operation of forming and disposing a flanged wad on the base of one of the said mandrels and also during the ejecting of the finished container from the mandrel, and means to remove the ejected container from the mandrel table.

7. In apparatus for the automatic production of paper or other containers, spring controlled co-acting jaws having two spaced arms which are independently pivoted to the mandrel table in vertical alignment with the radial arms thereof, the jaws being normally closed to move simultaneously with the radial arms during each intermittent movement by the table, a spindle supported by said jaws in radial alignment with the mandrel spindles, coupled rollers on the jaw spindles, the inner roller of which rides on a fixed cam track mounted below the mandrel table to move the said roller laterally at selected positions whereby a partial rotation is imparted to jaw spindles to actuate further rollers coupled to said spindles, spaced blocks on the arms of said jaws to impinge on the latter coupled rollers to expand the said jaw during the partial rotation of the spindles to disengage divided formers and molding tools, and pressure rollers from the continuously rotating mandrels.

8. In apparatus for the automatic production of paper or other containers, a plurality of radially arranged mandrels provided with yielding pressure rollers in frictional engagement with the said mandrels so as to rotate in unison therewith, brackets supporting said rollers and rods attached to said brackets, said rods being incorporated with spring controlled jaws independently pivoted to the mandrel table, divided holders and molding tools carried by said jaws to close around the mandrels, an actuating spindle in said jaws in alignment with the mandrel spindles, said spindle operating at selected positions to expand the said jaws, a bifurcated arm on the jaw spindle slidably engaging with collars on the rods carrying the roller brackets whereby during the operation of the said spindle the rollers are disengaged from the mandrel while the jaws are open.

9. In apparatus for the automatic production of paper or other containers a rotatable table having radially arranged arms carrying the spindles of continuously rotating mandrels, divided holders and molding tools disposed around the said mandrels, a divisional space on the said mandrels between the said divided holders for frictional contact with yielding pressure rollers rotating in unison with the said mandrels, the divided holders and tools and pressure rollers being carried on spring controlled and expandable jaws disposed in vertical alignment with the radial arms of the table, each set of jaws being pivoted to permit of the said jaws being expanded to disengage the associated mechanisms from the mandrels, a fixed cam track on the mandrel table acting in combination with said jaws, an intermittently operable star wheel coupled to said table to partially rotate the said table through a definite arc and then pause prior to moving the next step, each pause between the intermittent steps by the table synchronizing with the operations of co-operative mechanisms and tools for completing the formation of a container.

10. In apparatus for the automatic production of paper or other containers, means to maintain pivoted co-acting jaws expanded until a punching and blocking action has been completed to form a flanged wad for the bottom of the container, said means consisting in a pivoted curved track concentric with a fixed cam track disposed on a mandrel table, cam control for the pivoted curved track to move it into the path of an outer roller coupled to the actuating spindle of the jaws, to prevent the said jaws from closing, the control cam being timed to release the pivoted track from the roller after the punch has descended in preparation for the reception of a body blank to the mandrel when the jaws close to clamp divided formers and molding tools and pressure rollers in position and against the said mandrel.

11. In apparatus for the automatic production of paper or other containers means for simultaneously folding the extended peripheral edge of the top of the container and for turning in the lower peripheral edge of the container around the flange of the previously formed wad constituting the bottom of the container, said means comprising spaced upper and lower arms, each of which carries a divided tool, cam control to actuate said arms to swing together and close to permit the shaped tools carried thereon to close on the top and bottom of the container respectively in synchronization with the termination of each stepped movement of an intermittently operable table whereby a rotating mandrel carrying the said container is brought into alignment with the united and closed position of the tool carrying arms.

12. In apparatus for the automatic production of paper or other containers spaced upper and lower sets of arms, each of which carries the halves of a divided tool, the respective halves of which are adapted to unite on the top and bottom of the extended peripheral edges of a container body disposed on a continuously rotating mandrel, a support for said mandrel, molding tools on the said mandrel support to cooperate with the united sections of the upper divided tool whereby the upper edge of the container is folded over into an angular recess in the molding tools simultaneously with the united sections of the lower tool turning in the lower edge of the container around the previously formed bottom portion and means to move the respective halves of the tools clear of the mandrel on completion of the simultaneous operations.

13. In apparatus for the automatic production of paper or other containers, upper and lower spaced arms carrying divided tools, movable bosses on the inner ends of said arms, spring wound spindles extending through said bosses, pinions mounted on the lower ends of said spindles to mesh with each other, projections on the arm bosses to engage with strikers, rollers on the end of the strikers, spaced cams in engagement with the rollers, said cams being mounted on a vertical timing shaft, a further cam on the lower end of said shaft, a roller in engagement with said cam, a pivoted link fitted to the roller and a connecting rod from said link to one of the pinions for the purpose of effecting a partial rotation to the spindles carrying the tool arms.

14. In an apparatus for the automatic production of paper or other containers, means for simultaneously forming an annular recess in the folded top of a container for the reception of a closure wad and for finally locking the previously folded and flanged bottom of the container, said means comprising pivoted tools vertically disposed and timed to enter the top and bottom respectively of the container, a body forming mandrel, outer friction rollers rotating in unison with said mandrel having aligning grooves, a circumferential beading on the upper tool to depress the adjacent paper surface into said aligning grooves in each outer friction roller, a roller stem on the lower tool to finally lock the flanged bottom of the container and means to raise and lower the respective tools clear of the container and mandrels on the completion of the respective operations.

15. In apparatus for the automatic production of paper or other containers as claimed in the preceding claim, cooperative tools pivotally mounted on the right angled extensions of spring controlled arms, rollers on the ends of said arms which are enclosed in housings, a double action cam in engagement with said rollers, the said cam being mounted on a timing shaft, spaced cams on the timing shaft, bifurcated connecting rods in engagement with the spaced cams and extending transversely through slots in the housings and the right angled arms, rollers on the end of the transverse tools to impinge on the shoulders of the respective tools and a spring control for each tool for the purposes specified.

16. In an apparatus for the automatic production of paper or other containers, cooperative tools simultaneously form an annular recess in the folded top of the container and block the folded bottom of the container, a mandrel, an outer pressure roller rotating in unison with said mandrel having an angular groove, the upper tool being provided with a beading to depress the adjacent paper surface into the annular groove, divided holders disposed around said mandrel, molding tools carried on said holders having an annular recess in alignment with the recess in the outer roller whereby the depression in the paper formed by the tool is directed into and rotates within the annular recesses in the molding tools and the friction rollers respectively.

17. In apparatus for the automatic production of paper or other containers, a body forming mandrel, means to eject a completed container from said body forming mandrel, said means comprising a divided ejecting tool the halves of which are carried on spaced arms adapted to swing and converge together under cam control in synchronism with the mandrel reaching the termination of a stepped movement whereon the said divided tool closes on the folded top of the container and with a limited depressing movement forces the said container off the mandrel on to a conveyor.

18. In apparatus for the automatic production of paper or other containers, continuously rotating mandrels having associated therewith divided holders and pressure rollers frictionally driven to rotate in unison with the said rollers, divided molding tools disposed on the top of the holders and around the mandrels, said tools having an upper annular recess and a lower recess to cooperate with independently operable tools to fold the top of a container and form an annular internal groove in the folded top of the container respectively.

Signed at Melbourne, Victoria, Australia, this 23rd day of January A. D. 1931.

OSCAR ADOLF GRANOWSKI.